United States Patent [19]

Odom et al.

[11] Patent Number: 5,900,627
[45] Date of Patent: May 4, 1999

[54] FORMATION DENSITY MEASUREMENT UTILIZING PULSE NEUTRONS

[75] Inventors: Richard C. Odom, Benbrook, Tex.; Richard W. Streeter, Maracaibo, Venezuela; Robert D. Wilson, Grand Junction, Colo.

[73] Assignee: Computalog Research, Inc., Fort Worth, Tex.

[21] Appl. No.: 08/878,545

[22] Filed: Jun. 19, 1997

[51] Int. Cl.$^6$ ........................................ G01V 5/12
[52] U.S. Cl. .................... 250/269.7; 250/269.6
[58] Field of Search ............... 250/269.7, 269.6

[56] References Cited

U.S. PATENT DOCUMENTS

| | | |
|---|---|---|
| 3,946,226 | 3/1976 | Smith, Jr. . |
| 4,055,763 | 10/1977 | Antkiw . |
| 4,122,339 | 10/1978 | Smith, Jr. et al. . |
| 4,122,340 | 10/1978 | Smith, Jr. et al. . |
| 4,239,965 | 12/1980 | Oliver et al. . |
| 4,297,575 | 10/1981 | Smith, Jr. et al. . |
| 4,430,567 | 2/1984 | Oliver et al. . |
| 4,605,854 | 8/1986 | Smith, Jr. . |
| 4,645,926 | 2/1987 | Randall . |
| 4,656,354 | 4/1987 | Randall . |
| 5,374,823 | 12/1994 | Odom . |
| 5,525,797 | 6/1996 | Moake . |
| 5,608,215 | 3/1997 | Evans ...................... 250/269.6 |

FOREIGN PATENT DOCUMENTS

0552073A2  7/1993  European Pat. Off. .

OTHER PUBLICATIONS

Anonymous, *Log Interpretation Charts*, p. 101, Dresser Atlas, Dresser Industries, Inc., USA, Jun. 1983.

J. Tittman and J. S. Wahl, "The Physical Foundations of Formation Density Logging (Gamma–Gamma)," pp. 284–293, *Geophysics*, vol. XXX, No. 2, Apr. 1965.

Cased Hole Exploration: Modern Pulsed Neutron Techniques for Locating By–Passed Hydrocarbons in Old Wells, by R.W. Streeter et al. from Mar. 1996, SPE Permian Basin Oil & Gas Recovery Conference.

A New 1.625" Diameter Pulsed Neutron Capture and Inelastic/Capture Spectral Combination System Provides Answers in Complex Reservoirs, by R.C. Odom et al. from Jun. 1994 SPWLA Annual Logging Symposium.

Program and pertinent slides from a presentation by Richard Odom at SIAM Symposium on Inverse Problems: Geophysical Applications, Dec. 17, 1995.

PDK–100 Log Examples in the Gulf Coast, by R.R. Randall et al. for the Jun. 1985 SPWLA Annual Logging Symposium.

The PDK–100 Enhances Interpretation Capabilities for Pulsed neutron Capture Logs, by R.R. Randall et al. from the Jun. 1986 SPWLA Annual Logging Symposium.

(List continued on next page.)

*Primary Examiner*—Constantine Hannaher
*Attorney, Agent, or Firm*—Jack V. Musgrove; Andrew J. Dillon

[57] ABSTRACT

A device for measuring the density of a formation uses a high-energy pulsed neutron source which induces gamma rays in the formation, and determines a gamma diffusion length of the formation based on the attenuation of gamma rays produced by inelastic scattering of fast neutrons. The borehole tool houses the neutron source along with a near gamma ray detector and a far gamma ray detector. The gamma ray detectors are located at different distances from the fast neutron source and spaced sufficiently from the fast neutron source such that dependence of inelastic gamma counts on fast neutron transport and gamma production of the formation is substantially reduced. Gamma ray events can be sorted and counted in time- and energy-dependent bins. The present invention has several advantages over gamma-gamma logging, including deeper penetration of gamma, and is also superior over systems which measure, e.g., hydrogen-based porosity.

15 Claims, 5 Drawing Sheets

OTHER PUBLICATIONS

Using Pulsed Neutron Decay–Spectrum Data and Multi–inflatable Packer Plugdown Assemblies Improve Oil Production Rates in a Mature $CO_2$ Flood, by B.D. Schneider from Mar. 1996 SPE Permian Basin Oil & Gas Recovery Conference.

"Bulk Density Logging with High–Energy Gammas Produced by Fast Neutron Reactions with Formation Oxygen Atoms" by Robert D. Wilson, 1995 IEEE Nuclear Science Symposium and Medical Imaging Conference Record, vol. 1, Oct. 21–28, 1995, San Francisco.

FORMATION DENSITY MEASUREMENT UTILIZING PULSE NEUTRONS

BACKGROUND OF THE INVENTION

1. Field of the Invention

The present invention generally relates to oil and gas well (borehole) logging tools, and more particularly to an improved method of measuring the density of geologic formations using pulsed neutrons to produce gamma radiation which travels through the formation, wherein the gamma diffusion length provides a measure of density.

2. Description of the Related Art

Logging tools for measuring earth formation properties are well known, particularly those used in the location of underground petroleum products (oil and gas). Many borehole logging instruments use various techniques to determine geophysical properties such as bulk density, porosity, water saturation, and gas saturation. Among these techniques are those involving the use of radiant energy. For example, gamma rays are commonly used to measure bulk density of a formation by detecting such radiation as it passes through the formation and relating the amount of detected radiation to the electron density of the formation. See, e.g., U.S. Pat. No. 4,297,575.

Gamma rays can be emitted continuously from a source in the borehole tool and propagate outward into the formation. A typical gamma ray source is cesium-137. The electron density of the formation is calculated based on the count rate or intensity of the backscattered gamma rays that are received at detectors located in the tool. Usually at least two detectors (far and near) are used, which allows a measure of formation density that is essentially independent of the mudcake surrounding the tool (the mudcake is the layer of solid material lining the open borehole that has consolidated from the drilling fluid). The detectors are shielded from direct radiation from the gamma ray source by high density material located in the tool body. The use of a gamma ray source and gamma ray detectors is referred to as gamma-gamma logging. See generally, "The Physical Foundations of Formation Density Logging (Gamma-Gamma)," Geophysics vol. XXX, no. 2 (April 1965).

These two-detector density logging tools are satisfactory for use with open, smooth boreholes, but they have a limited depth of investigation (~4" or 10.2 cm) and are not quantitative in cased holes. Cased-hole density logs are often needed to evaluate producing gas wells, and for environmental monitoring. While these instruments can compensate for mudcake, they are unable to accurately compensate for the borehole casing and cement. In particular, the steel casing is up to one-half inch thick and very dense, and thus very effective at blocking the passage of low-energy gamma rays. Various attempts have been made to overcome these limitations. One prior art technique, disclosed in U.S. Pat. No. 5,525,797, requires the use of three or more detectors, and results in improved measurements, but the need for more detectors clearly complicates the tool (and makes it more expensive). Another approach is to use a source with a higher energy level of gamma rays, such as cobalt-60 (which provides 1.173 and 1.333 MeV gamma rays instead of the 0.662 MeV gamma rays from cesium). Although this approach has some advantages, the tool will still have a relatively shallow depth of investigation.

A different approach involves detection of gamma radiation produced in the formation in response to a high-energy neutron source, referred to as induced gamma ray logging. The radiation is analyzed using one of two common techniques to determine the porosity (not density) of the formation. The two methodologies are referred to as GST (gamma spectroscopy tool) and C/O (carbon:oxygen). In the GST-type method, silica, calcium and hydrogen levels are broken out using spectral techniques, and the amount of hydrogen is compared to the combined amount of silica and calcium to determine porosity. In C/O systems, carbon and oxygen levels are determined using spectral techniques and the ratio is then related to porosity.

When the neutron source is pulsed, gamma rays are produced by one of three reactions, inelastic scattering of fast neutrons (neutrons with an energy of about one MeV or within about one order of magnitude), epithermal neutron capture (neutrons with an energy of about one eV), and thermal neutron capture (neutrons with an energy of about 0.025 eV). The fast-neutron lifetimes are very small (a few microseconds) such that during the source pulse a mixed-energy neutron field exists. Shortly after the burst, all neutrons are thermalized (slow down) and these thermal neutrons wander about until being captured, with a lifetime in the hundreds of microseconds. Gamma rays from inelastic scattering are produced in close proximity to the accelerator, and gamma rays from thermal capture are dispersed farther from the accelerator (up to tens of centimeters).

Techniques for determining porosity based on capture gammas fall into one of five basic detector types: single thermal neutron detectors; dual thermal neutron detectors; single epithermal neutron detectors; dual epithermal neutron detectors; and pulsed-neutron capture gamma-ray detectors. A single thermal neutron detector examines the slowing down lengths (amounts of hydrogen and steel in the environment) and relates the number of thermal neutrons to the amount of hydrogen, i.e., a low count rate implies more hydrogen and higher porosity. A dual thermal neutron detector is similar to a single thermal neutron detector but the former has two detectors to provide for compensation techniques for neutron absorbers and near-wellbore variations. A single epithermal neutron detector also similar to a single thermal neutron detector, but the former examines slowing down lengths to epithermal energies. A dual epithermal neutron detector again uses two detectors to provide compensation for near-wellbore variations. A pulsed-neutron capture gamma-ray detector measures the gamma rays produced by thermal neutron absorption using two detectors (far and near), and relates differences in count rates to the amount of hydrogen present.

An early GST system is shown in U.S. Pat. No. 4,055,763 which uses a pulsed fast neutron source and one detector. Thermal neutron decay times are derived which characterize the formations based on ratios of elemental constituents such as hydrogen, calcium and silicon. An early C/O logging system is disclosed in U.S. Pat. No. 3,946,226, which uses a pulsed fast neutron source and one gamma ray spectroscopy detector. Both the inelastic and capture gammas are analyzed to determine the carbon:oxygen ratio. That patent also notes that the inelastic gamma ray counting rate is to some degree dependent on the hydrogen content of the formation. Later instruments added further refinements. For example, U.S. Pat. Nos. 4,122,339 and 4,122,340 teach a method of combining the fast and epithermal neutron population measurements to provide a measurement of porosity; an organic scintillator can replace the gamma ray detector to make fast neutron measurements. The same basis for the porosity derivation is described in U.S. Pat. No. 4,605,854, but speaks in terms of the pulse height range of the fast neutron energy spectrum only. In U.S. Pat. No. 4,239,965, the logging tool examines the ratio of gamma ray energies in the capture signal to determine both carbon:oxygen and hydrogen:iron ratios.

Another device using a high energy neutron source is disclosed in U.S. Pat. Nos. 4,645,926 and 4,656,354 (and is sold under the brand name PDK-100 by Dresser Atlas, a division of Dresser Industries, Inc.). That device measures the ratio of inelastic to capture gamma rays (RIC) which is related to porosity. These patents note that heavy elements (higher density) create more inelastic gamma rays such that the higher the density, the higher the inelastic component in the ratio. The "inelastic" count rate used in actually a mix of capture and inelastic rates since no attempt is made to separate these components, so it is unclear what the basis of this porosity determination would be when the capture and inelastic gamma ray mix varies due to non-porosity factors. A method for separating the inelastic scattering events from the mixed count samples during the source pulse is taught in U.S. Pat. No. 5,374,823. A variation of the RIC is described in U.S. Pat. No. 4,430,567, specifically involving the ratio of capture events collected after the source pulse to the mixed capture and inelastic events collected during the source pulse. The '926 and '354 patents also refer to the ratio of inelastic gamma rays measured by the near and far detectors (RIN), which is used to identify wellbore geometry variations. The RIN is also used to differentiate hydrocarbon type in shaly sands, but no attempt has been made to relate RIN to porosity.

Yet another approach involving the use of high-energy neutrons relates to inelastic porosity (IPHI) which is a logarithmic function of the near detector inelastic rate, with increasing counts equal to a higher porosity. The same measurement made at the far detector is referred to as FPHI. Recorded count rates are processed to remove the capture and background components leaving only inelastic gamma rays. these inelastic count rates are then scaled in porosity as a logarithmic function of the count rate with an offset. This response is very similar to that of an open-hole density. IPHI is mentioned in "Cased Hole Exploration: Modern Pulsed Neutron Techniques for Locating By-Passed Hydrocarbons in Old Wells," Society of Petroleum Engineers (SPE) Permian Basin Oil & Gas Recovery Conference Proceedings, pp. 167–176 (March 1996); "A New 1.625" Diameter Pulsed Neutron Capture and Inelastic/Capture Spectral Combination System Provides Answers in Complex Reservoirs," SPWLA 35th Annual Logging Symposium (June 1994); and "Using Pulsed Neutron Decay-Spectrum Data and Multi-inflatable Packer Plugdown Assemblies Improve Oil Production Rate in a Mature $CO_2$ Flood," SPE Permian Basin Oil & Gas Recovery Conference Proceedings, pp. 203–209 (March 1996). Near-wellbore variations and low hydrogen content formations can cause large variances in the gamma ray source size and strength, causing large uncertainties in the porosity calculations. This porosity is based on the fact that the gamma rays created by the inelastic scatter of fast neutrons are Compton-scattered as they make their way to the detectors where they are counted. As long as the transport length is sufficient for the attenuation of the gamma rays (by Compton scattering) to be the dominant component in the received signal, a density-type porosity can be computed. However, if the porosity, borehole size and content are such that Compton scattering is no longer the dominant component (i.e., the gamma ray transport length is short due to the gamma ray creation taking place "near" one or both detectors), then the sensitivity of the count rate to porosity can be diminished (or even inverted).

To summarize the foregoing, gamma-gamma logging provides a measure of formation bulk density (which is problematic with cased holes), while induced gamma ray logging provides a measure of formation porosity (which can also be problematic as noted). A further problem with hydrogen-based porosity measurement is that it rests on two important assumptions: that there is little or no hydrogen in a solid rock matrix, and that all hydrogen present is in the form of water located in the pores. These assumptions can fail, such as in a shale which has a high hydrogen level, or in a formation having a high porosity but filled with gas, not water. Therefore, extrapolating density from porosity is not necessarily accurate.

A hybrid technique may be used wherein induced gamma rays from a high-energy neutron source are analyzed to determine bulk density directly, instead of porosity. See "Bulk Density Logging With High-Energy Gammas Produced by Fast Neutron Reactions with Formation Oxygen Atoms," 1995 IEEE Nuclear Science Symposium (copyright 1996). Attenuation of the high-energy neutrons as they transport into the formation, and attenuation of the gammas by the material between the detectors and the gamma sources, are the bases for the density measurement. In this system, a near detector is positioned close (22 cm) to the pulsed source for monitoring the output field and a far detector is placed at a large spacing (100 cm) for density sensitivity. The measured data are the count rates during the burst period. This logging method appears to penetrate more deeply into the formation, even in the presence of borehole casing and grout. Subsequent experiments, however, have shown anomalous behavior as the formation and borehole were filled with water, an effect of the capture counts not being removed. It would, therefore, be desirable to devise a method of using induced gamma ray logging to determine bulk density instead of porosity, but which is not subject to this deficiency. It would be further advantageous if the method were less sensitive to borehole variations.

SUMMARY OF THE INVENTION

It is therefore one object of the present invention to provide an improved method of determining the density of a geological formation using a borehole tool.

It is another object of the present invention to provide such a method and tool which uses a high-energy neutron source to induce gamma radiation in the surrounding formation.

It is yet another object of the present invention to provide such a method and tool which can more accurately identify the presence of water in the formation.

The foregoing objects are achieved in a device for measuring the density of a formation, generally comprising means for inducing gamma rays in the formation, means for detecting gamma rays induced in the formation by said inducing means, and means for computing a gamma diffusion length of the formation based on gamma rays detected by said detecting means. The inducing means includes a fast neutron source which creates gamma rays from inelastic scattering and thermal capture, and the computing means computes the gamma diffusion length of the formation by analyzing only the gamma rays created from the inelastic scattering. Gamma rays associated with thermal capture are stripped out of the mixed gamma ray count (based on gamma rays from both inelastic scattering and thermal capture occurring during a burst from said fast neutron source), by either projecting exponential decay rates for thermal capture gamma rays to obtain a value for thermal neutron capture components of the mixed count, or by deriving a fixed parameter for a ratio of capture to inelastic events. The detecting means includes a near gamma ray detector, a far gamma ray detector, means for counting gamma rays detected by the near and far detectors, and means for controlling the counting means. The gamma ray detectors are located at different distances from the fast neutron source and spaced sufficiently from the fast neutron source such that dependence of inelastic gamma counts on fast neutron transport and gamma production of the formation is substantially reduced. Gamma ray events can be sorted and counted in time- and energy-dependent bins.

The present invention exhibits deeper penetration of gamma backscattering as compared to a gamma-gamma system, making a cased-hole density measurement feasible, and has other advantages over gamma-gamma logging. This measurement can be made simultaneously with the same standard hardware that is used to measure the capture cross-section measurements ($\Sigma$), the hydrogen-based thermal neutron porosity, and hydrocarbon saturation from inelastic spectroscopy. The present invention is also superior over systems which measure, e.g., hydrogen-based porosity, since the present invention instead measures bulk density. The described borehole tool can be easily packaged in a pressure housing capable of going through tubing (1⅝" or 4.1 cm minimum diameter).

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
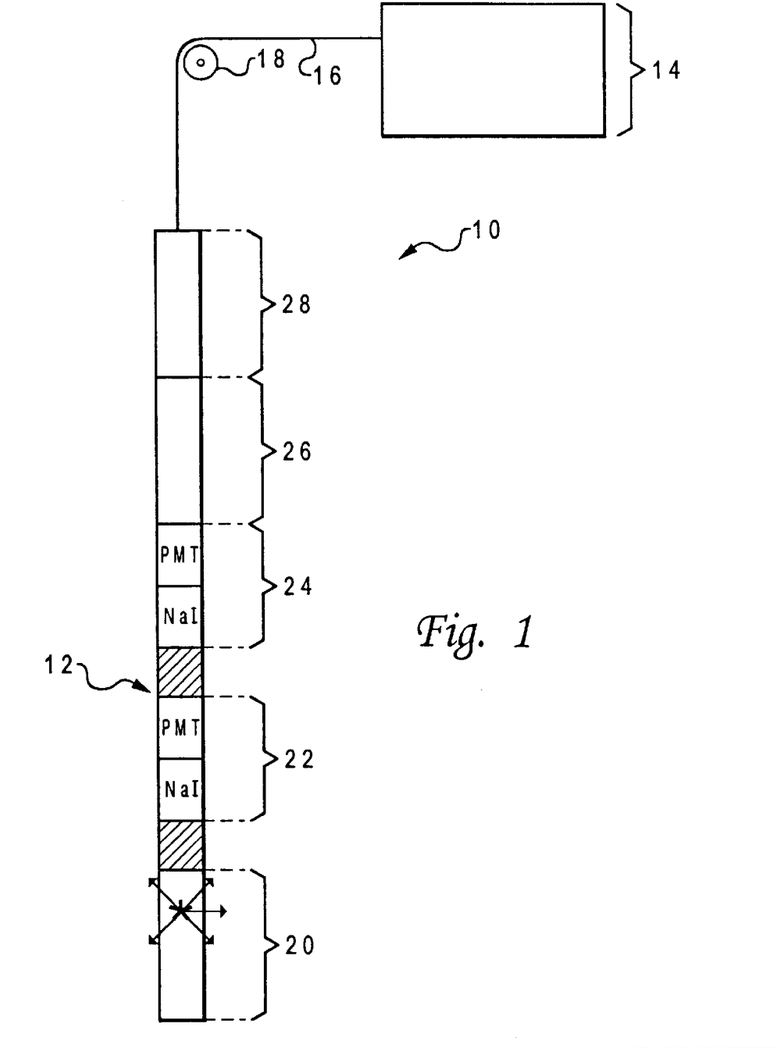
FIG. 1 is a schematic diagram of one embodiment of the density formation measurement system of the present invention.

With reference now to the figures, and in particular with reference to FIG. 1, there is depicted one embodiment of a formation density measurement system 10 constructed in accordance with the present invention. System 10 is generally comprised of a sonde or borehole tool 12 which is connected to a surface computer 14 and lowered into the well bore by a wireline 16 and appropriate mechanical support as generally indicated at 18. Surface computer 14 is used for data acquisition, analysis and storage, and merges density output data with raw measurements for storage and presentation.

Figure 2:
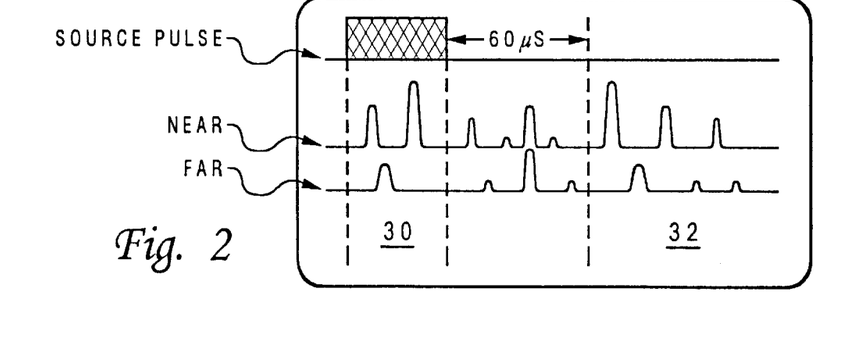
FIG. 2 is a graph depicting a neutron source pulse and the resulting traces of gamma ray events from near and far detectors.
Figure 3:
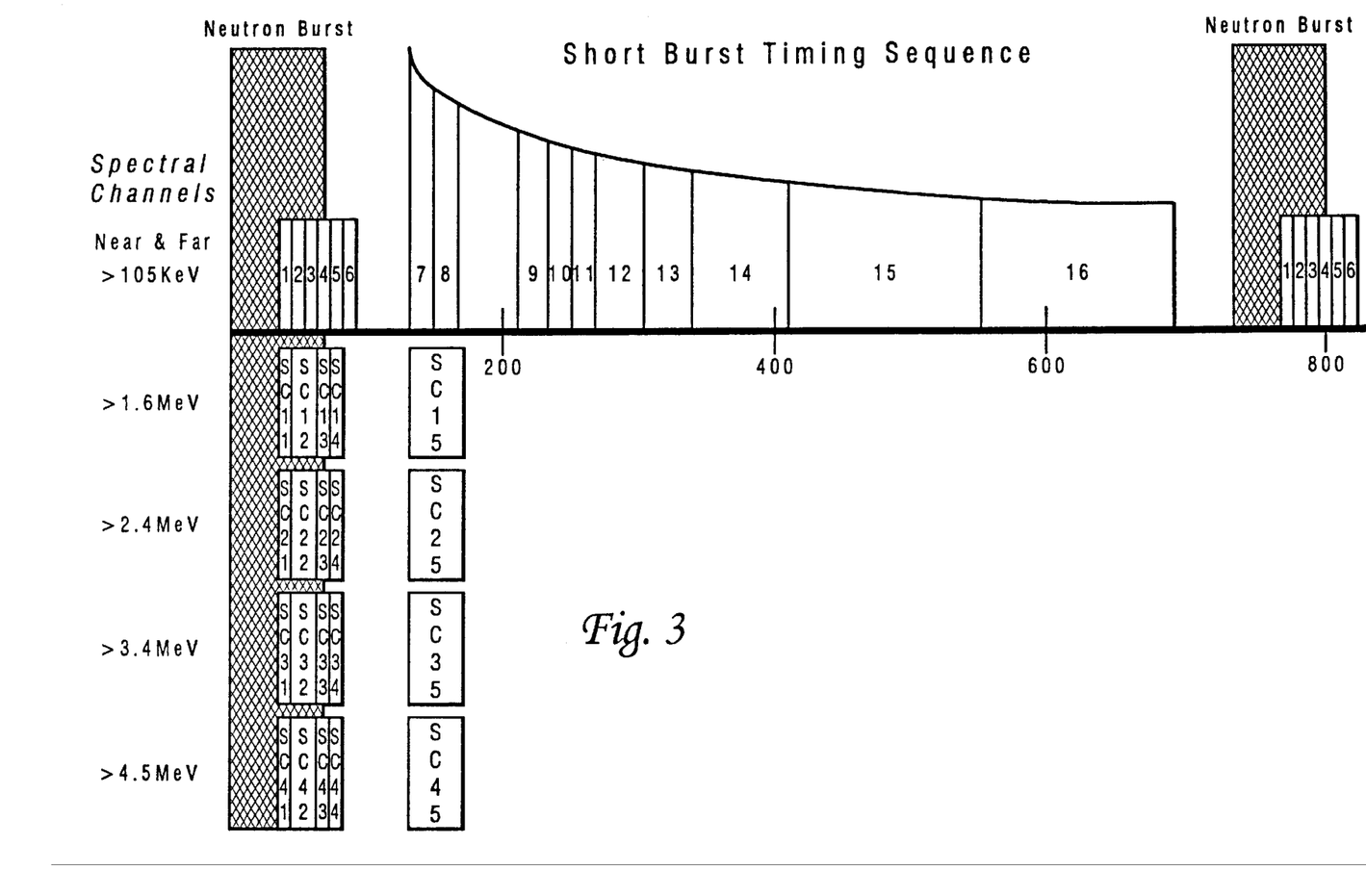
FIG. 3 is diagram depicting counting and storing of the gamma ray events in time- and energy-dependent bins.

Borehole 12 includes a housing having a pulsed neutron source 20, a near gamma ray detector 22, a far gamma ray detector 24, counter hardware 26, and a sonde controller 28. In the disclosed embodiment, the inelastic scattering of fast neutrons is used to produce a dispersed gamma source centered around the neutron accelerator. Sonde controller 28 processes commands from surface computer 14 and controls the other components of tool 12. As shown in FIG. 2, there is a first time period 30 during the source pulse when the detectors are receiving a mixture of inelastic and capture events. At a later period 32 (say, 60 $\mu$s after the pulse), capture events predominate. Counter hardware 26 is synchronized with the source pulse, and gamma ray events detected by detectors 22 and 24 are sorted and counted in time- and energy-dependent "bins" by counter hardware 26, as shown in FIG. 3.

The data acquisition subsystem of tool 12 can be adapted from the tool sold by Computalog under the model name "PND-S." That subsystem uses an accelerator-based fast neutron source (D-T tube) with a pulse of 14 MeV neutrons. The near and far detectors are NaI (Tl) crystals optically coupled to high count rate photo-multiplier tubes. The neutron source is pulsed for 40–50 $\mu$s every 700 $\mu$s. As the pulse of fast neutrons spreads, the neutrons are slowed from elastic and inelastic scattering with the incident media. The dominant reactions for producing gamma rays are inelastic scattering of fast neutrons and thermal neutron capture. The fast neutron lifetimes are very small (a few microseconds) such that during the source pulse a mixed-energy neutron field exists. Shortly after the burst, all neutrons have been thermalized, and these thermal neutrons wander about until being captured with a lifetime of hundreds of microseconds. As seen in FIG. 3, counts are collected in 16 time bins for both near and far detectors. The time bins during the burst collect gamma rays from the mixed-energy neutron field, and the time bins after the burst collect counts for the thermal neutron field. In the depicted embodiment, the bins are associated with five spectral channels ranging from 105 KeV to greater than 4.5 MeV. Data from approximately 500 pulses is accumulated in sonde controller 28 into a sample which is then transmitted to the surface.

The gamma rays from inelastic scattering, being made from fast neutrons, are produced in close proximity to the accelerator. Gamma rays from thermal capture are dispersed farther from the accelerator (up to tens of centimeters). In both cases there are nuclear cross-sections that describe the probabilities of the neutrons slowing down, of the gamma ray production, and of the energy distribution of the produced gamma rays. The inelastic gamma counts received at a detector are therefore sensitive to three parameters: fast neutron transport; gamma production; and gamma transport. Fast neutron transport is a source term; it governs the size of the initial gamma distribution created by the fast neutron distribution. Gamma production is also a source term; the density and composition of the media that fast neutrons are incident upon determine the number and energy distribution of produced gamma rays. The gamma transport term describes the attenuation of the gamma rays as they are transported to the proximity of the detector. This parameter is governed by the density of the media and the geometric distribution of the density. At sufficient spacings the gamma transport term may be the dominant factor in the number of received gamma rays from inelastic scattering. When this is the case, the total received inelastic count can be mapped to formation density.

Use of a differential of the received inelastic signal at two (or more) detectors eliminates the dependence on the two source terms (fast neutron transport and gamma production), if the detectors are at sufficient spacings from the neutron source, say, 35 cm and 65 cm (the preferred minimum spacing is 20 cm). The attenuation is measured between the two detectors, not as a total count rate. In the present invention, a physical model is used to describe the gamma ray transport length parameter, or gamma diffusion length (LRHO), which is inversely proportional to the density. The derivation of the gamma diffusion length is based on Boltzmann's equation. A solution to the steady-state diffusion equation for isotropic media (no borehole) for the flux at a given distance from the source is:

$$f(r) = C\frac{e^{-r/L}}{4\pi r},$$

where r is the source-to-detector distance, L is the gamma diffusion length, and C is a constant relating to source strength and the diffusion coefficient. Substituting the detector spacings into two equations, the value of L can be solved for, and then approximated as:

L=constant/[ln(near inelastic rate)-ln(far inelastic rate)].

This computation is carried out by surface computer 14 based on the sample forwarded by sonde controller 28. The solution of this simple isotopic model is generally sufficient for deriving the gamma diffusion length. The solution of a more complex theoretical model (e.g, adding a borehole and dispersed source description) or an empirical model could be used to solve for the gamma diffusion length parameter.

Figure 4:
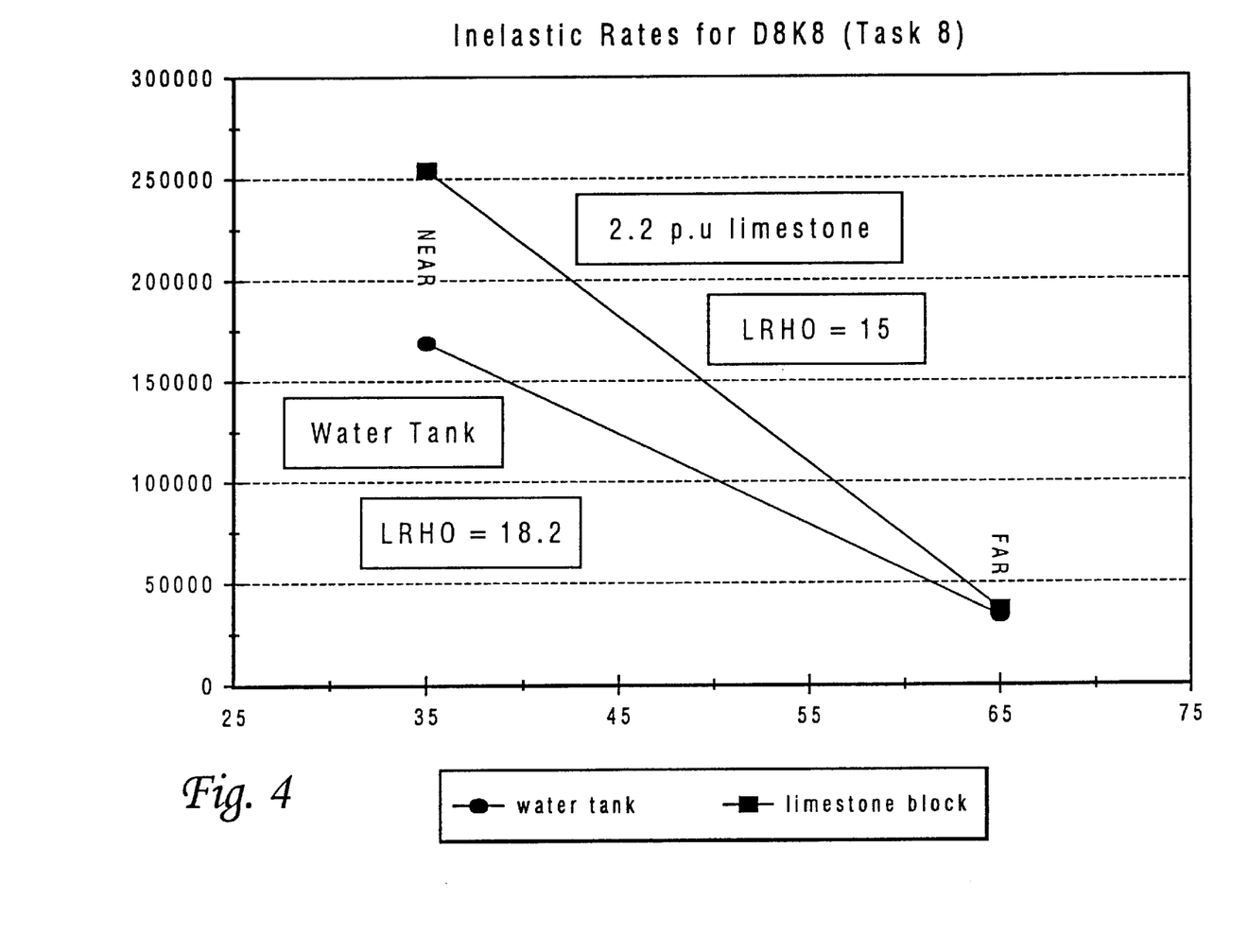
FIG. 4 is a graph depicting calculation of the gamma diffusion length of the formation in accordance with the present invention.
Figure 5:
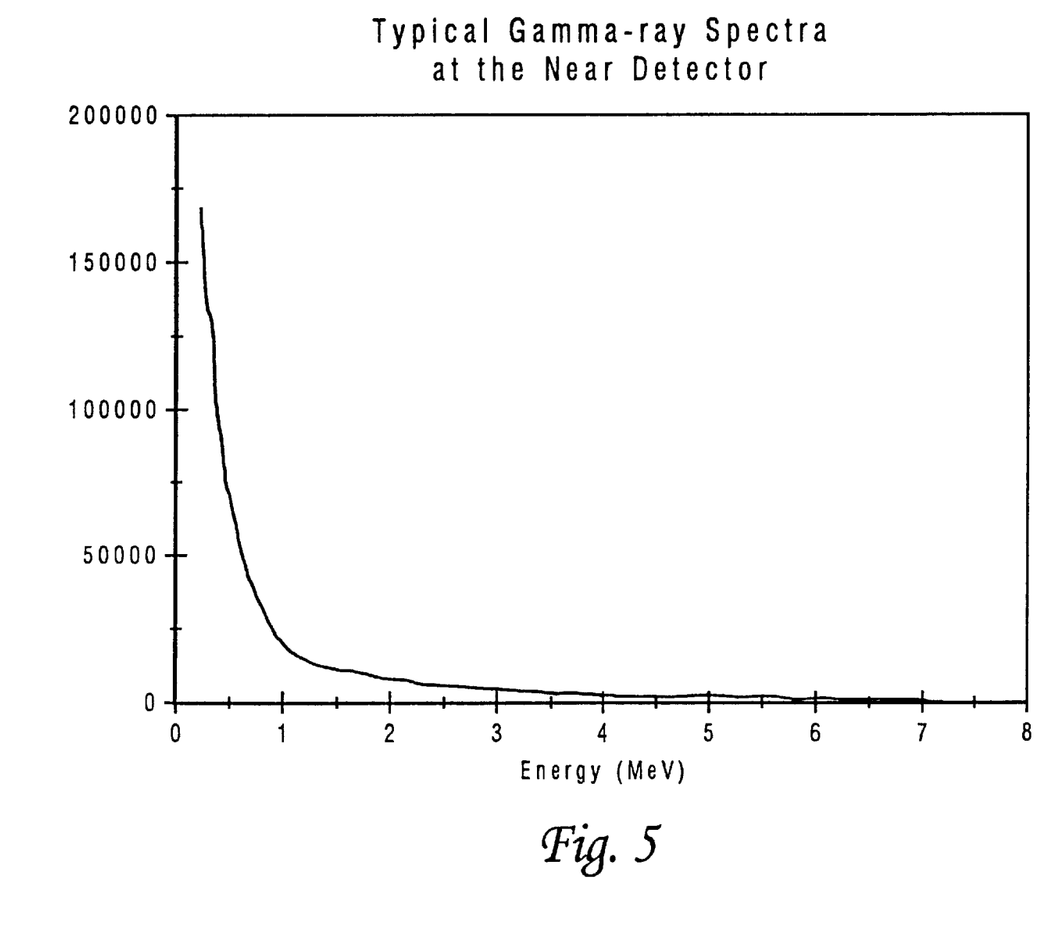
FIG. 5 is an energy spectra of the near detector of the borehole tool of the present invention in a water tank.

As the source terms (fast neutron transport and gamma production) become prominent, the situation illustrated in FIG. 4 is created. This graph shows data for a water tank and a 2.2 p.u. limestone formation. The response of the near detector is being dominated by the source terms; the inelastic counts went up in the limestone as the gamma source grew in size. The far detector had essentially no sensitivity to the two test pits. In contrast, the gamma diffusion lengths (the slopes of the lines in FIG. 4) remained predictable and showed a steeper slope associated with the heavier attenuation in the limestone. FIG. 5, which is a typical near detector energy spectra for a water tank, shows that the predominant attenuation mechanism is Compton scattering, as most gammas are in the range of 0.1 MeV to 2.5 MeV.

In order to measure the gamma diffusion length, the present invention analyzes gamma rays exclusively from inelastic scattering. The separation or stripping of inelastic events from the mixed-event count are preferably accomplished using the techniques described in U.S. Pat. No. 5,374,823, wherein the measured exponential decay rates for thermal neutrons are projected to obtain a value for thermal neutron capture components of the total energy spectra detected during neutron burst periods. A simpler, less exact stripping mechanism might be sufficient, where a fixed parameter would be derived for the ratio of capture to inelastic events for the entire logged interval.

Figure 6:
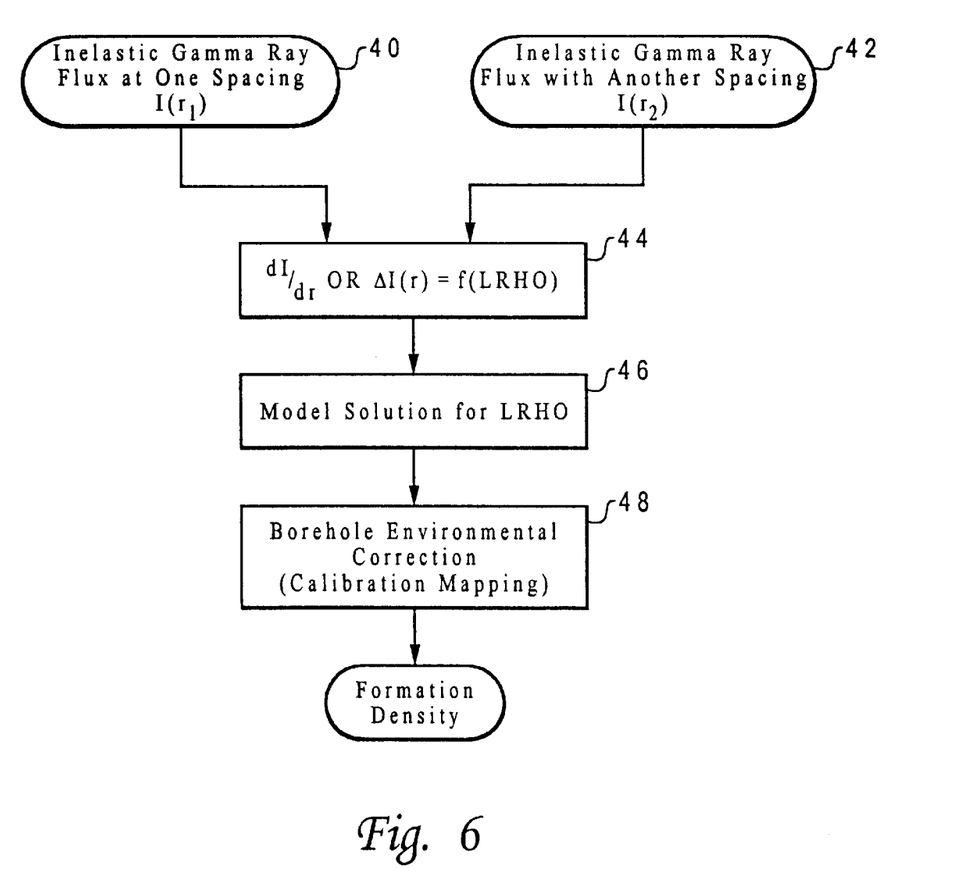
FIG. 6 is a flowchart depicting calculation of formation density according to the present invention.

The generalized flow of the calculation is shown in FIG. 6. The inelastic gamma ray flux (40) at one spacing (e.g., the near detector) and the inelastic gamma ray flux (42) at another spacing (e.g., the far detector) are used to calculate the differential of the flux as a function of distance (44). This differential is used as an input to a model solution for the gamma diffusion length (46). Corrections are made for environmental (borehole) conditions, using calibration mapping (58), resulting in the calculated formation density.

In actual application, the measured gamma diffusion length is based on gamma rays transported through the formation, through the borehole, and combinations of paths. The borehole forms a low density "shunt" for the gamma rays, such that the formation sensitivity is diminished in larger boreholes. If the present invention is applied to boreholes with larger outer diameter restrictions, better formation sensitivity can be attained by using shielding to block gamma rays from streaming up the borehole, and using a void area next to the accelerator to displace the borehole fluid (more fast neutrons into the formation).

The existence of the borehole means that the gamma diffusion length measurement will not be exact. Data from test pits and computer modelling can be used to empirically map the gamma diffusion length into density. Preliminary logs can be calibrated to open-hole density logs using polynomial regression or neural networks as will become apparent to those skilled in the art upon reference to this disclosure. Measurements based on the differential signal will theoretically be less sensitive to borehole variations since other common mode terms, as well as the source terms, will be cancelled.

As with gamma-gamma systems, the elemental makeup of the rock matrix (lithology) must be assumed or calculated from other measurements such as neutron-induced gamma ray spectroscopy. The higher gamma ray energies of this method have different lithology effects since gamma ray attenuation by pair-production have to be considered.

The present invention has several advantages, including the deeper penetration of gamma backscattering as compared to a gamma-gamma system. The induced gamma ray source is dispersed into the formation and is comprised of higher-energy gamma rays. The dispersed gamma ray source and the larger spacings give this technique deep enough penetration to make a cased-hole density measurement feasible. The deeper depth of investigation makes the measurement less sensitive to borehole and near wellbore parameters, such as rugosity and invasion. The gamma-gamma system relies on pad contact to measure the density, but the present invention is based on a centric geometry, rather than focused from the pad face, thus hole rugosity is only a small contribution to the borehole signal. Induced gamma ray logging also can use an electronic source which has advantages in safety and disposal compared to chemical gamma sources. The electronic source has only a small amount of low level radioactive material and does not generate any potentially harmful radiation until turned on. Gamma-gamma density requires a backup arm to keep the pad against the side of the hole, and these mechanical linkages must operate under high pressures, and become a significant part of the cost and maintenance of such systems, but this component is not required in the present invention.

The present invention is superior over traditional cased-hole porosity devices that only measure a hydrogen-based porosity. When the hydrogen-based porosity and the density-based porosity are combined, a more comprehensive description of the formation os attained. It also has advantages over the induced gamma ray logging system described in the 1995 IEEE Nuclear Science Symposium article. That prior technique measured a mixture of the capture signal and the inelastic signal, leading to potential problems that do not occur in the present invention. Also, the use of the gamma diffusion length parameter avoids the problem noted in the Description of the Related Art concerning the introduction of water into the formation or borehole. Finally, the described borehole tool can be easily packaged in a pressure housing capable of going through tubing (1⅝" or 4.1 cm minimum diameter).

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A device for measuring the density of a formation, comprising:

means for inducing gamma rays in the formation;

means for detecting gamma rays induced in the formation by said inducing means, said detecting means including a near gamma ray detector, a far gamma ray detector, means for counting gamma rays detected by said near and far detectors, and means for controlling said counting means; and means for computing a gamma diffusion length of the formation based on gamma rays detected by said detecting means.

2. The device of claim 1 wherein:

said inducing means includes a fast neutron source which creates gamma rays from inelastic scattering and thermal capture; and said computing means computes the gamma diffusion length of the formation by analyzing only said gamma rays created from said inelastic scattering.

3. The device of claim 2 wherein said near and far gamma ray detectors are located at different distances from said fast neutron source and spaced sufficiently from said fast neutron source such that dependence of inelastic gamma counts on fast neutron transport and gamma production of the formation is substantially reduced.

4. The device of claim 3 wherein said detectors have a minimum spacing from said fast neutron source of 20 cm.

5. The device of claim 2 wherein said computing means strips gamma rays associated with thermal capture out of a gamma ray count based on gamma rays from both inelastic scattering and thermal capture occurring during a burst from said fast neutron source, by projecting exponential decay rates for thermal capture gamma rays to obtain a value for thermal neutron capture components of said count.

6. The device of claim 2 wherein said computing means strips gamma rays associated with thermal capture out of a gamma ray count based on gamma rays from both inelastic scattering and thermal capture by deriving a fixed parameter for a ratio of capture to inelastic events.

7. The device of claim 1 wherein:

said inducing means includes a fast neutron source;

said counting means is synchronized with said fast neutron source; and gamma ray events detected by said detectors are sorted and counted in time- and energy-dependent bins.

8. A method of measuring the density of a formation, comprising the steps of:

inducing gamma rays in the formation;

detecting gamma rays induced in the formation using a near gamma ray detector and a far gamma ray detector, and counting gamma rays detected by said near and far detectors; and computing a gamma diffusion length of the formation based on the detected gamma rays.

9. The method of claim 8 wherein:

said step of inducing the gamma rays is performed using a fast neutron source which creates gamma rays from inelastic scattering and thermal capture; and said computing step computes the gamma diffusion length of the formation by analyzing only the gamma rays created from inelastic scattering of fast neutrons.

10. The method of claim 9 further comprising the step of locating the near and far gamma ray detectors at different distances from the fast neutron source and spaced sufficiently from the fast neutron source such that dependence of inelastic gamma counts on fast neutron transport and gamma production of the formation is substantially reduced.

11. The method of claim 9 wherein said computing step includes the step of stripping gamma rays associated with thermal capture out of a gamma ray count based on gamma rays from both inelastic scattering and thermal capture occurring during a burst from said fast neutron source, by projecting exponential decay rates for thermal capture gamma rays to obtain a value for thermal neutron capture components of said count.

12. The method of claim 9 wherein said computing step includes the step of stripping gamma rays associated with thermal capture out of a gamma ray count based on gamma rays from both inelastic scattering and thermal capture by deriving a fixed parameter for a ratio of capture to inelastic events.

13. The method of claim 8 wherein said inducing step is performed using a fast neutron source, and said counting step is performed using a counter, and further comprising the steps of:

synchronizing the counter with the fast neutron source; and sorting gamma ray events detected by the detectors in time- and energy-dependent bins.

14. A borehole tool for measuring the density of a formation, comprising:

a housing adapted to be lowered into a borehole;

a pulsed neutron source located in said housing for inducing gamma rays in the formation, created by inelastic scattering and thermal capture;

at least two gamma ray detectors located in said housing at different distances from said pulsed neutron source, spaced sufficiently from said pulsed neutron source such that dependence of inelastic gamma counts on fast neutron transport and gamma production of the formation is substantially reduced; and means for computing a gamma diffusion length of the formation based on gamma rays created only from inelastic scattering and detected by said at least two detectors.

15. The borehole tool of claim 14 wherein said computing means include:

a counter, located in said housing, for counting gamma rays detected by said at least two detectors;

a controller, located in said housing, for synchronizing the counter with the pulsed neutron source; and a computer connected to said counter and said controller, said computer including means for stripping away gamma rays associated with thermal capture out of a gamma ray count based on gamma rays from both inelastic scattering and thermal capture.

* * * * *

UNITED STATES PATENT AND TRADEMARK OFFICE
CERTIFICATE OF CORRECTION

PATENT NO. : 5,900,627
DATED : May 4, 1999
INVENTOR(S) : Odom et al.

It is certified that error appears in the above-identified patent and that said Letters Patent is hereby corrected as shown below:

At col. 1, line 45, change "(—4" or" to --(~4" or --.

Signed and Sealed this

Fourteenth Day of September, 1999

Attest:

Q. TODD DICKINSON

Attesting Officer     *Acting Commissioner of Patents and Trademarks*